(12) United States Patent
Starkey et al.

(10) Patent No.: US 12,413,505 B2
(45) Date of Patent: Sep. 9, 2025

(54) RESILIENT NETWORK ROUTING

(71) Applicant: BRITISH TELECOMMUNICATIONS PUBLIC LIMITED COMPANY, London (GB)

(72) Inventors: Andrew Starkey, London (GB); Lewis Veryard, London (GB); Hani Hagras, London (GB); Gilbert Owusu, London (GB)

(73) Assignee: British Telecommunications Public Limited Company, London (GB)

( * ) Notice: Subject to any disclaimer, the term of this patent is extended or adjusted under 35 U.S.C. 154(b) by 588 days.

(21) Appl. No.: 17/310,017

(22) PCT Filed: Dec. 18, 2019

(86) PCT No.: PCT/EP2019/085936
§ 371 (c)(1),
(2) Date: Jul. 9, 2021

(87) PCT Pub. No.: WO2020/144026
PCT Pub. Date: Jul. 16, 2020

(65) Prior Publication Data
US 2022/0094624 A1    Mar. 24, 2022

(30) Foreign Application Priority Data

Jan. 10, 2019 (EP) .................................... 19151298

(51) Int. Cl.
*H04L 45/00*    (2022.01)
*H04L 45/128*    (2022.01)
*H04L 45/28*    (2022.01)

(52) U.S. Cl.
CPC ............ *H04L 45/22* (2013.01); *H04L 45/128* (2013.01); *H04L 45/14* (2013.01); *H04L 45/28* (2013.01)

(58) Field of Classification Search
CPC ....... H04L 45/128; H04L 45/14; H04L 45/22; H04L 45/28
See application file for complete search history.

(56) References Cited

U.S. PATENT DOCUMENTS

| 2003/0227877 | A1 | 12/2003 | Kar et al. |
| 2010/0103937 | A1 | 4/2010 | O'Neil |
| 2014/0086065 | A1 | 3/2014 | DeCusatis et al. |

FOREIGN PATENT DOCUMENTS

| CN | 108494678 A | | 9/2018 |
| KR | 20170051153 A | * | 5/2017 |

OTHER PUBLICATIONS

Combined search and Examination Report for Great Britain Application No. 1900370.6, mailed on Jun. 3, 2019, 5 pages.

(Continued)

*Primary Examiner* — Peter P Chau
(74) *Attorney, Agent, or Firm* — EIP US LLP (57) ABSTRACT

A computer implemented method of determining non-intersecting primary and secondary routes between source and destination nodes in a communications network. The communication network represented by a graph data structure of nodes and edges, the edges having a weight corresponding to a resource involved in traversing the edged. The method including: defining a population set of primary routes, wherein each primary route in the population set identifies a secondary route based on a greedy route-finding algorithm applied to the graph having edges in the primary route excluded from the graph, such that the primary and secondary routes are non-intersecting routes through the graph; applying a genetic algorithm to the population set to iteratively select and crossover one or more pairs of primary routes in the population set; and selecting, from the popu- (Continued)

lation set, a primary route and corresponding secondary route having a lowest aggregate weight of edges.

8 Claims, 5 Drawing Sheets

(56) References Cited

OTHER PUBLICATIONS

Dijkstra E W., "A Note on Two Problems in Connexion with Graphs," Numerische Mathematik, vol. 1, 1959, pp. 269-271.
Extended European Search Report for Application No. 19151298.7, mailed on May 24, 2019, 8 pages.
International Preliminary Report on Patentability for Application No. PCT/EP2019/085936, mailed on Jul. 22, 2021, 8 pages.
International Search Report and Written Opinion for Application No. PCT/EP2019/085936, mailed on Feb. 17, 2020, 13 pages.
Le V. T., et al., "A Hybrid Algorithm for Dynamic Lightpath Protection in Survivable WDM Optical Networks," Proceedings of the 8th International Symposium on Parallel Architectures, Algorithms and Networks (ISPAN'05), XP010878234, Dec. 7, 2005, 6 pages.
Melanie M., "An Introduction to Genetic Algorithms," Fifth printing, ISBN 0-262-13316-4, 1999, 162 pages.
Rashvand H.F., et al., "Genetic Algorithm Quality of Service Design in Resilient Dense Wavelength Division Multiplexing Optical Networks," IET Commun, vol. 2, No. 4, XP006030903, Apr. 2, 2008, pp. 505-513.
Yen J. Y., "Finding the K Shortest Loopless Paths in a Network," Management Science, Jul. 1971, vol. 17, No. 11, 6 pages.
Z956's Blog, "Multi-path Dijkstra Algorithm & ECMP," 2013, 8 Pages.

* cited by examiner

RESILIENT NETWORK ROUTING

PRIORITY CLAIM

The present application is a National Phase entry of PCT Application No. PCT/EP2019/085936, filed Dec. 18, 2019, which claims priority from EP Application No. 19151298.7, filed Jan. 10, 2019, which is hereby fully incorporated herein by reference.

TECHNICAL FIELD

The present disclosure relates to the identification of multiple non-intersecting network routes for resilience.

BACKGROUND

Communications network connectivity in networks such as telecoms and computer networks has become an essential part of modern society as the World has developed to be more reliant on interconnectivity. Two points on a network can usually be connected through multiple independent routes with there being a shortest, lowest resource or lowest cost route that can be traversed to connect them. If only one route between the two points was required this shortest route would be the best way to connect them, this is known as the primary route. In an ideal world this would be the only route required but sometimes network connections represented by edges in a network graph can fail and/or network appliances or interconnecting devices constituted by nodes in the graph can fail and it can be difficult and time consuming to identify such faults. To avoid a loss of service, a backup route between the two points on the network is provided. For best effect, such a secondary route must be completely independent of the primary route in that there is no use of common nodes or edges in the network graph between the two routes. For example, if both routes use a particular node and that node becomes disconnected from the rest of the graph, it will cause a single point of failure for both routes.

Thus, it is desirable to provide improvements to the determination of multiple routes between two points in a network that do not intersect.

SUMMARY

The present disclosure accordingly provides, in a first aspect, a computer implemented method of determining non-intersecting primary routes and secondary routes between source node and a destination node in a communications network represented by a graph data structure of a plurality of nodes and a plurality of edges, each of the plurality of edges having a weight corresponding to a resource involved in traversing the edge, the method comprising: defining a population set of primary routes based on at least one initial primary route between the source node and the destination node and at least one additional primary route defined based on a mutation of the at least one initial primary route, wherein the at least one initial primary route is determined by a greedy route-finding algorithm, and wherein each primary route in the population set identifies a secondary route based on the greedy route-finding algorithm applied to a graph excluding edges in the primary route, such that the primary and secondary routes are non-intersecting routes through the graph data structure; applying a genetic algorithm to the population set to iteratively select and crossover one or more pairs of primary routes in the sorted population set, the genetic algorithm being applied until a stopping condition is reached, wherein at least a subset of the selected one or more pairs of primary routes are mutated in the population set; and selecting, from the population set, a primary route and a corresponding secondary route having a lowest aggregate weight of edges.

In an embodiment, mutation of a route includes randomly replacing a node of the route with an alternate node and generating a remainder of the route from the alternate node to the destination node or from the start node to the alternate node, the alternate node being selected based on accessibility of the alternate node via a preceding node or a succeeding node in the route.

In an embodiment, crossover of a selected pair of primary routes includes dividing each of a first route and a second route of the pair of primary routes into a head portion and a tail portion and connecting the head portion of the first route to the tail portion of the second route and vice versa, so as to generate two new primary routes.

In an embodiment, the method further comprises, responsive to a determination that one or more of the new primary routes is an invalid route due to one or more adjacent nodes in the invalid route not being provided with an edge therebetween in the graph data structure, adjusting the invalid route by applying the greedy route-finding algorithm to the one or more adjacent nodes to determine a revised route therebetween and including the revised route in the primary routes.

In an embodiment, defining the population set includes determining a longest route length of routes in the population set; and wherein the new primary routes having a length exceeding the longest route length are not included in the population set.

In an embodiment, the genetic algorithm periodically triggers sorting of the population set according to a lowest aggregate weight of edges in each primary route and corresponding secondary route such that, in each iteration, the genetic algorithm is operable on one or more pairs of primary routes selected as having relatively lower aggregate edge weights than a statistical mean, average, mode or percentile of aggregate edge weights in the population set.

The present disclosure accordingly provides, in a second aspect, a computer system including a processor and a memory storing computer program code for performing the steps of the method set out above.

The present disclosure accordingly provides, in a third aspect, a computer program element comprising computer program code to, when loaded into a computer system and executed thereon, cause the computer system to perform the steps of the method set out above.

BRIEF DESCRIPTION OF THE DRAWINGS

Embodiments of the present disclosure will now be described, by way of example only, with reference to the accompanying drawings, in which.

DETAILED DESCRIPTION

Greedy shortest path algorithms can be used in routing problems with Dijkstra's algorithm being one commonly used method for finding a shortest path (E. Dijkstra, "Solution of a Problem in Concurrent Programming Control", Communications of the ACM, Vol. 8, No. 9, pp. 569, September 1956.)

With conventional routing methods, such as Dijkstra's algorithm, the greedy nature of the routing becomes problematic. When routing for network resilience there is a need to have multiple routes between two locations whilst also minimizing total cost (such as a total amount of resource employed to traverse a route). A greedy algorithm's first pass of a network will take the objectively lowest cost route, which will leave less desirable or higher cost routes for a second pass.

Genetic algorithms are good at optimizing solutions with the ability to explore a solution space and exploit potentially optimal solutions which is needed in resilience routing which can be seen as a solution optimization problem with multiple components. How those components interact is an important question, which can be answered by examining the problem in an industrial context. In industry it is important to provide a reliable service and have a low operational cost. Therefore, there must be at least two routes between a start and finish location to provide a reliable service. It is, however, also important that this can be achieved at low resource without comprising the quality or reliability of the service.

Genetic algorithms include those described in "An Introduction to Genetic Algorithms" (Melanie Mitchell, MIT Press, 1996). Genetic algorithms and their applications are described in, inter alia: C. Ahn and R. S. Ramakrishna, "A genetic algorithm for shortest path routing problem and the sizing of populations,", IEEE Transactions on Evolutionary Computation, Vol. 6, No. 6, pp. 566-579, December 2002; E. Alba and B. Dorronsoro "Solving the Vehicle Routing Problem by Using Cellular Genetic Algorithms" Procedings of 2004 European Conference on Evolutionary Computation in Combinatorial Optimization, Coimbra, Portugal, pp 11-20, 2004; A. Starkey, H. Hagras, S. Shakya, and G. Owusu "A Genetic Algorithm Based Approach for the Simultaneous Optimisation of Workforce Skill Sets and Team Allocation." In: Bramer M., Petridis M. (eds) Research and Development in Intelligent Systems XXXIII. SGAI 2016. Springer; M. Barbosa and M. Jr., "Access Point Design with a Genetic Algorithm," Proceedings of the Sixth International Conference on Genetic and Evolutionary Computing, Kitakushu, pp. 119-123, 2012; and X. Chen, Z. Bo, X. Dong and S. Shi, "Analysis of ant colony algorithm for finding the optimal circuitous route in the communication network of power system," Proceedings of the 5th International Conference on Electric Utility Deregulation and Restructuring and Power Technologies (DRPT), Changsha, pp. 2532-2535, 2015.

Communications including network and telephony communications can be end-to-end routing such as connections between a company headquarters and data centers or data centers and retail outlets. A reliable, high-quality service is desired with minimal down-time. One way to reduce down-time is to provide multiple routes between the end-points. Therefore, any fault in a primary route can be addressed by the system switching to a resilient secondary route without an interruption in service. To ensure there is no single point of failure, both the primary and secondary routes should not share the same network node or communication infrastructure. Thus, when represented as a graph data structure, the two routes will not share nodes or edges. This demonstrates the need for multiple non-intersecting routes across a network.

Figure 1A:
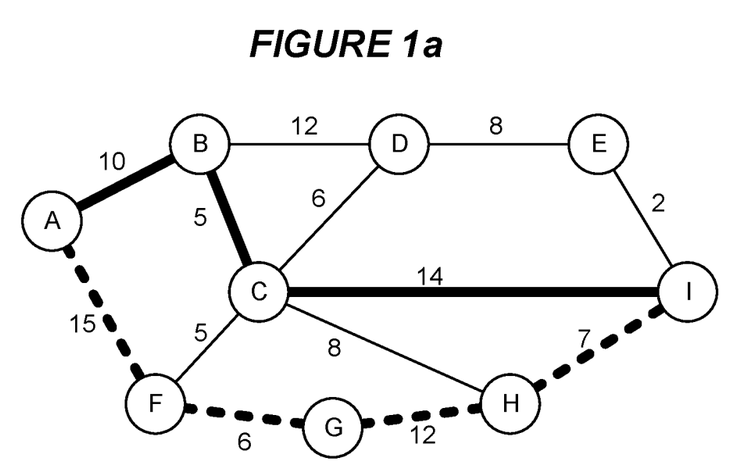
FIGS. 1a and 1b depict an exemplary network graph having nodes and weighted edges including depictions of exemplary primary and secondary routes.
Figure 1B:
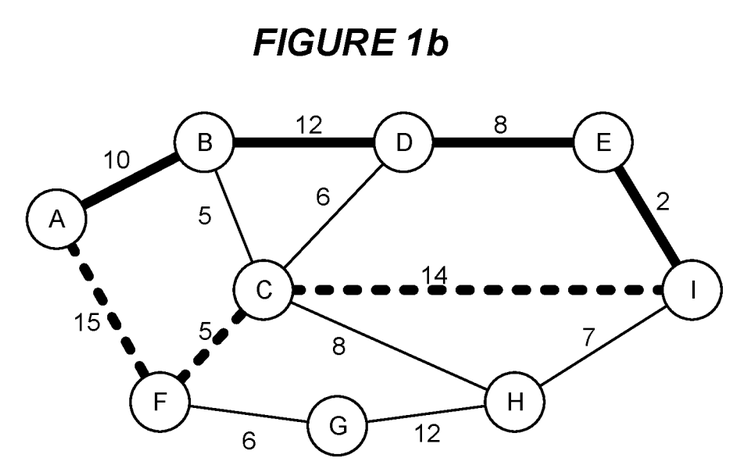

Greedy algorithms, such as Dijkstra's algorithm, provide shortest (lowest resource) paths in a network, although on their own they are unsuitable for addressing the above challenge. This unsuitability arises because such algorithms are inherently greedy in their path finding, obtaining a lowest cost (resource) route. This is an issue in relation to finding multiple routes between locations because a first route could utilize all of the lowest cost (or "best") edges in the network graph which may lead to a dramatic increase the cost of any subsequent routes found. This problem is seen in FIGS. 1a and 1b which depict an exemplary network graph having nodes and weighted edges including depictions of exemplary primary and secondary routes. A primary route is indicated by a heavy unbroken line, while a secondary route—also referred to herein as a resilient route—is indicated by a heavy broken line. Note that the primary route and secondary route never intersect to provide the requisite resilience. The primary route of FIG. 1a (A, B, C, I) has a cost of 29 (10+5+14) and the secondary routs (also known as a "resilient route") (A, F, G, H, I) has a cost of 40, which results in a total cost of 69. Whereas the optimized routes could find a lower total cost with a slightly increased cost of the primary route as seen in FIG. 1b in which the primary route (A, B, D, E, I) costs 32 and the resilient route (A, F, C, I) costs 34, which results in a total cost of 66.

Figure 2A:
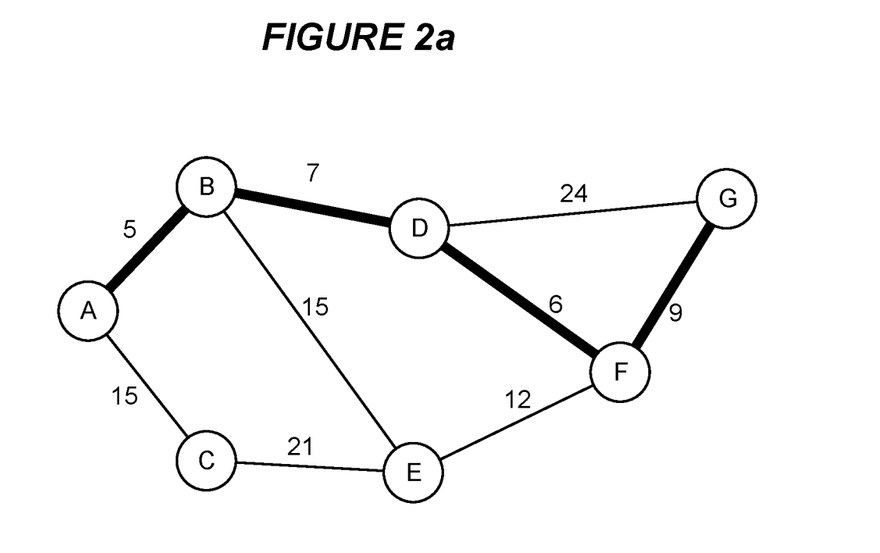
FIGS. 2a and 2b depict a second exemplary network graph having nodes and weighted edges including a depiction of exemplary primary and secondary routes.
Figure 2B:
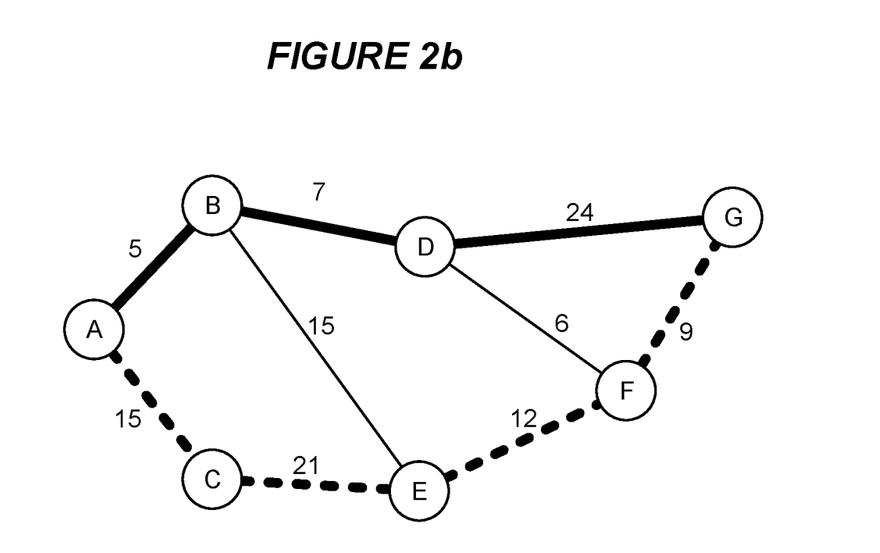

In some arrangements, algorithms such as Dijkstra could prevent subsequent routes from being found after determining a primary route, such as due to some key infrastructure being used in the primary route. This is illustrated in FIGS. 2a and 2b which depict a second exemplary network graph having nodes and weighted edges including a depiction of exemplary primary and secondary routes. The primary route of FIG. 2a (A, B, D, F, G) has a cost of 14 and precludes the identification of a secondary non-intersecting (resilient) route (hence no secondary resilient route is indicated in FIG. 2a). This is not ideal since the availability of a resilient route is precluded. However, a change to the primary route such as that illustrated in FIG. 2b indicates that both a primary and secondary route could be located. The primary route of FIG. 2b (A, B, D, G) costs 36, and the resilient route (A, C, E, F, G) costs 57, which gives a total cost of 93, though both routes are now available which is much more desirable due to the availability of a resilient route.

Genetic Algorithms (GAs) are inspired by nature taking the core ideas of evolution, selection and mutation. In GAs a population will adapt itself to its environment through many generations. Chromosomes are ranked through survival of the fittest, meaning individuals most suited an environment are ranked more highly. Each possible solution to a problem is represented as a chromosome, with a chromosome being made up of a collection of genes with a gene encoding a portion of a specific solution. Genetic information is passed from generation to generation allowing promising genes to thrive. This information is passed on through a process named "crossover" in which two chromosomes are selected to produce offspring chromosomes. These offspring contain a portioning of genes from each parent, and therefore are a combination of both solutions to a problem. Chromosomes are chosen for crossover through a process known as "selection". Those skilled in the art will be aware that there are numerous different ways that selection could occur, including, inter alia: tournament; or roulette wheel based on their individual fitness score. Fitness is determined by some specific measurable metric which could be a value that needs to be minimized or maximized. If a population of chromosomes surpasses a predesignated size, lowest ranked solutions can be removed from the population allowing only fittest solutions to survive.

Just as in nature there is a random chance of mutation, this happens in GAs when offspring are produced during the crossover process. Mutation is good for the population as it allows for new genes to appear in the population and thus allows the GA to explore new possible solutions. Through multiple generations of crossover, selection and mutation, evolution will begin to occur with dominant chromosomes rising to the top of the genepool. After a predesignated number of generations, or satisfaction of some other suitable stopping criteria, the GA will cease and a solution with the best fitness value will be chosen from the population as the selected solution.

Figure 3:
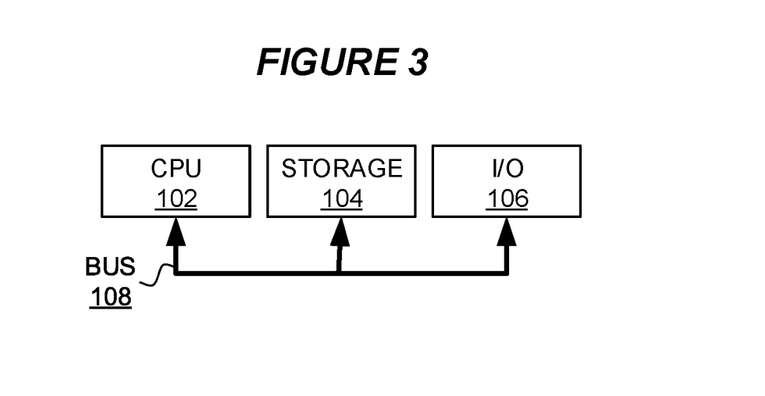
FIG. 3 is a block diagram of a computer system suitable for the operation of embodiments of the present disclosure.

FIG. 3 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 4:
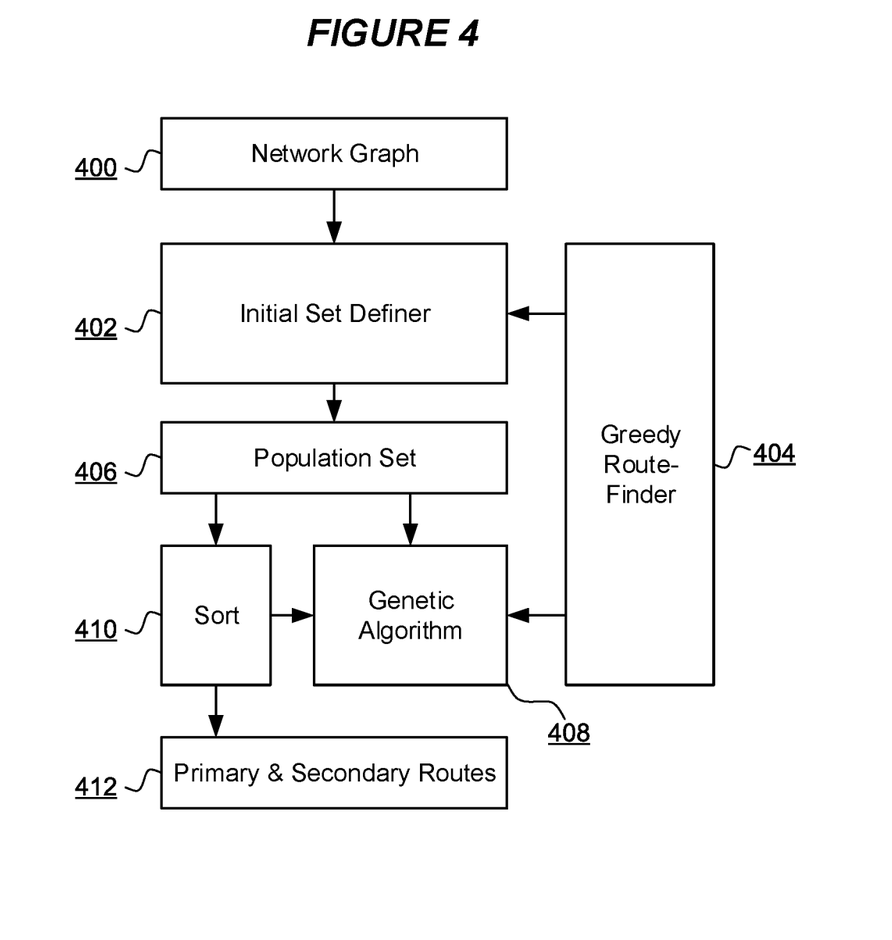
FIG. 4 is a component diagram of components arranged to determine non-intersecting primary and secondary routes between source and destination nodes in a communications network represented by a graph data structure according to embodiments of the present disclosure.

FIG. 4 is a component diagram of components arranged to determine non-intersecting primary and secondary routes between source and destination nodes in a communications network represented by a graph data structure 400 according to embodiments of the present disclosure. A network graph 400 is a representation of a network such as a communications or telephony network. The graph 400 includes nodes representing, for example, interconnections, network appliances, computing infrastructure and the like, interconnected by edges representing communications links, cables, wired or wireless communications channels and the likes. Edges are weighted according to a quantity or volume or resource required to traverse the edge. For example, an amount of time, network bandwidth or the like. The arrangement of FIG. 4 is adapted to identify a pair of non-intersecting routes (a primary route and a secondary, or resilient, route) between a source node and a destination node in the graph 400. In particular, the identified routes are identified by an optimization process according to the arrangement of FIG. 4.

An initial set definer component 402 is a software, hardware, firmware or combination component arranged to define a population set of primary routes at a commencement of the route identification process of FIG. 4. The initial set definer 402 employs a greedy route-finder 404 such as Dijkstra's algorithm to identify a first primary route from the source to destination in the graph. This first primary route is added to the population set 406 which is a set of primary routes. Notably, each primary route in the set 406 serves also to identify a secondary route, either explicitly or by implication. A secondary route for a primary route is a re-application of the greedy route-finder 404 algorithm to the network graph 400 to identify a second route from the source to destination where the network graph 400 is adapted to exclude all edges included in the primary route. In this way it can be assured that the primary and secondary routes do not intersect.

It will be apparent to those skilled in the art, therefore, that the indication of a secondary route in relation to any particular primary route in the population set 406 is not necessary since a secondary route can nonetheless be determined for any given primary route based on the graph 400 (so adapted as described to exclude edges of the primary route) and the greedy route-finder 404. Nonetheless, in some embodiments, explicit indication and/or storage of a secondary route in association with each or some primary routes in the population set 406 may be provided.

The initial set definer 402 additionally defines one or more additional primary routes for inclusion in the population set 406, each additional primary route constituting a mutation of the first primary route. Mutation of a route includes randomly replacing a node in the route by a suitable alternative node. Notably, nodes corresponding to the source and destination of the route are not replaced. A node for replacement will have a preceding and succeeding node. The mutation can occur to affect the route after the node identified for replacement, or to affect the route before the node identified for replacement. Thus, where the mutation is to affect the route after the node for replacement, a node in the route immediately preceding the node for replacement is used to determine a suitable replacement node—as a node sharing an edge with the preceding node. Similarly, where the mutation is to affect the route up to the node for replacement, a node in the route immediately succeeding the node for replacement is used to determine a suitable replacement node—as a node sharing an edge with the succeeding node. The mutation continues such that the route is completed around the replacement node using a greedy route-finder algorithm 404. Thus, where the mutation is to affect the route after the node for replacement, the greedy route-finder algorithm 404 is used to determine a route from the replacement node to the destination node to constitute a complete mutated route. Similarly, where the mutation is to affect the route before the node for replacement, the greedy route-finder algorithm 404 is used to determine a route from the start node to the replacement node to constitute a complete mutated route.

Thus, the initial set definer 402 initially populates the set 406 with a first primary route and one or more mutated primary routes.

The process continues by employing a sort 410 component configured to sort the population set 406 according to a lowest aggregate weight of edges in each primary route and corresponding secondary route in the set 406. Thus, fitness of primary routes is determined by aggregate sum of edge weights for primary and secondary route pairs such that more suitable routes having lower aggregate sum weights can be identified.

The genetic algorithm 408 is a hardware, software, firmware or combination component adapted to perform genetic algorithm operations iteratively on the population set 406 with reference to the sort 410 function and the greedy route-finder 404. The genetic algorithm 408 performs a selection and crossover operation on pairs of primary routes selected from the population set 406. In an embodiment, the genetic algorithm periodically triggers sorting 410 of the population set 406 (such as at each iteration) according to a lowest aggregate weight of edges in each primary route and corresponding identified secondary route such that, in each iteration, the genetic algorithm is operable on pairs of primary routes selected as having relatively lower aggregate edge weights than a statistical mean, average, mode or percentile of aggregate edge weights in the set. This, more promising primary routes are processed by the genetic algorithm 408 to progressively improve the primary routes in the set 406.

A selected pair of primary routes is subjected to a crossover process by the genetic algorithm 408 as follows. Each primary route in the selected pair is considered a "parent" route and together are they used to generate "offspring" routes. Each parent route is divided into two portion: a head portion; and a tail portion. In an embodiment the dividing is such that the two portions are equal in size (i.e. the same number of route steps), or different in size by a single route step (in the case of an odd number of route steps). Crossover entails: generating a first offspring route as an aggregation of the head of a first parent route with the tail of the second parent route; and generating a second offspring route as an aggregation of the head of the second parent route with the tail of the first parent route. Thus, two candidate offspring routes are generated for addition to the population set 406.

Notably, the aggregation of head and tail portions of parent routes can generate invalid routes such as routes that include the same node more than once and/or routes having adjacent nodes that are not connected by an edge in the network graph 400. The inclusion of repeated nodes can be addressed by removal of one of the repeated nodes and all nodes in between the repeated nodes. The inclusion of adjacent nodes not connected by an edge in the graph 400 requires a process of repair of the route to render the route valid.

Repair of an offspring route having two adjacent nodes that are do not share an edge in the graph 400 is achieved by seeking a route between the two nodes using the greedy route-finder 404. The route bridging the gap between the nodes is then included in the offspring route to render it a valid route. To prevent offspring routes that are repaired in this way from extending to an unacceptable length, a length restriction can be imposed such that offspring routes are included in the population set 406 only if they meet maximum length criteria. In an embodiment, a maximum length is determined to be a longest length of routes in the population set 406 when it is first populated by the initial set definer 402, or some predetermined fixed or proportional increase of that length. Thus, in this way, offspring routes are added to the population set 406 and the genetic algorithm 408 proceeds iteratively selecting and applying crossover to routes in the set 406.

Additionally, the genetic algorithm 408 employs the mutation process previously described on at least a portion of the offspring routes so as to adjust the offspring routes. The mutation can take place selectively on all offspring routes, one offspring per pair of parent routes, periodically according to a predetermined schedule or randomly.

The genetic algorithm 408 continues in its iterative manner until a predetermined stopping condition is reached. The stopping condition can be, for example, inter alia: a predetermined number of generations (sets of offspring) generated by the genetic algorithm 408; a predetermined number of primary routes in the set 406; a predetermined or target aggregate total weight of a primary and secondary route indicated in the set 406; or other criteria as will be apparent to those skilled in the art.

On conclusion of the genetic algorithm a primary route is selected from the population set 406 based on the sort function 410 such that the primary route and corresponding secondary route have a lowest aggregate total weight of edges of all primary routes in the set 406. Such routes thus constitute an optimized primary and resilient secondary routes 412 through the network from the source and destination.

Figure 5:
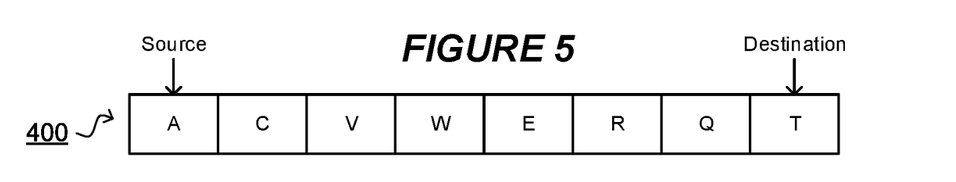
FIG. 5 depicts a route expressed as a chromosome for a genetic algorithm according to embodiments of the present disclosure.

An exemplary embodiment of the present disclosure in use will now be described. It will be appreciated that the following description is purely exemplary and adjustments can be made as will be apparent to those skilled in the art. The system starts by passing a selected source and destination nodes in the graph 400 into a greedy route-finder 404 such as Dijkstra's algorithm. A primary route found by the route-finder 404 is stored as the first primary route before it is removed from the graph 400 and the greedy route-finder 404 is run a second time to find a corresponding secondary route. The GA uses these routes as the basis of the population set 406 and mutates them to create the starting population set 406. Chromosomes are a one to one representation of a route taken, so if the route has 12 nodes then the chromosome has 12 genes. FIG. 5 depicts an exemplary route expressed as a chromosome for a genetic algorithm according to embodiments of the present disclosure.

The GA manipulates N−1 chromosomes per solution, where N is a number of desired routes between two locations in the graph 400, with a final route always being found by the greedy route-finder algorithm 404. For example, if N equals 2 (i.e. two routes are required) a solution will have one chromosome and will represent the primary route, the secondary route will be found using the greedy-route finder 404 (having had the primary route removed from the graph 400 first). The stopping criteria of the GA can be the number of generations that have been performed.

Figure 6:
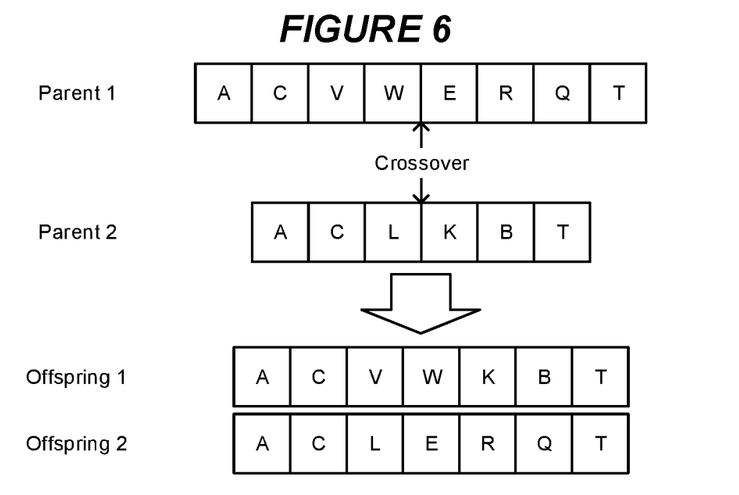
FIG. 6 depicts a crossover process used by a genetic algorithm according to embodiments of the present disclosure.

A GA can constitute main operations such as; Selection, Crossover, Repair, Mutation and Evaluation. The selection process is a best ranking survival of the fittest tournament. Solutions are ranked by the evaluation process (that can be undertaken by the sort function 410), then a random (e.g. 10%) sample can be taken from the population set 406 and the best ranked primary route is selected as a first parent for crossover. The sample is then returned to the population without the first parent, and a new random sample is taken, with the best ranked selected as the second parent. The crossover operation takes the two selected parents and produces two offspring. The crossover point of the two parents can be the center point, so offspring one will have the left side of parent one and the right side of parent two. This is illustrated in FIG. 6 which depicts a crossover process used by a genetic algorithm according to embodiments of the present disclosure. In FIG. 6, a first parent route "ACVWERQT" and a second parent "ACLKBT" are subject to the crossover process to generate a first offspring "ACVWKBT" and a second offspring "ACLERQT".

Once crossover is completed the chromosomes are checked to see if they are valid routes. If they are valid they are added to the population set 406. If they are not valid a repair process is undertaken. Any chromosomes that cannot be repaired are not added to the population set 406 and, additionally, if an identical chromosome is already in the population set 406 it cannot be added. These two criteria are used by the GA to keep it focused on valid solutions to the route-finding problem.

Figure 7A:
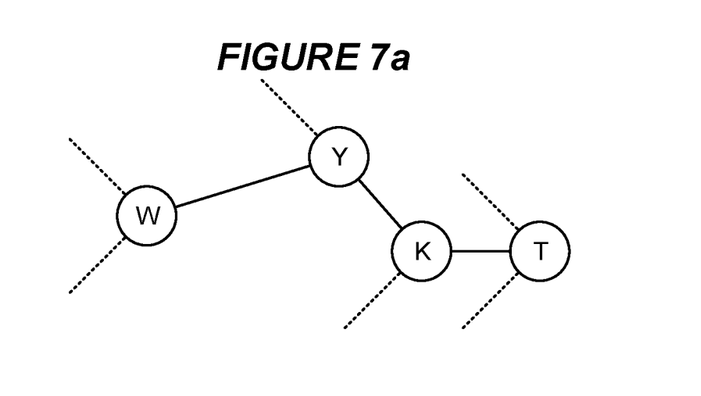
FIG. 7a depicts an exemplary partial network graph according to an embodiment of the present disclosure.
Figure 7B:
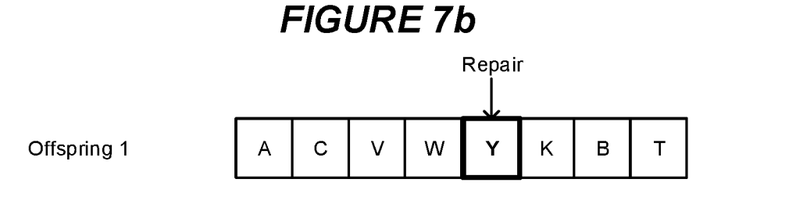
FIG. 7b depicts a repair process according to an embodiment of the present disclosure.

The repair process seeks to make invalid routes valid. There are two ways that a route could be invalid, first if a route includes the same node more than once. Secondly, if there are two adjacent nodes in the route which are not connected by an edge in the graph 400. The first scenario is simple to fix, remove all the nodes in-between the repeated nodes and one of the repeated nodes. Considering the second scenario, in the exemplary offspring of FIG. 6, offspring 1 is a route including transition from node W to note K. To demonstrate the second scenario of invalid route, FIG. 7a depicts an exemplary partial network graph for the graph of FIG. 6 in which it can be seen that there is no edge connecting nodes W and K. Thus, the route of offspring 1 is invalid. To resolve this, the greedy route-finder 404 is executed to find a route from W to K (which will pass via node Y). Thus, FIG. 7b depicts the repair process following execution of the greedy route-finder 414 in which node Y is inserted between nodes W and K. Notably, a length check of the resulting repaired route may be taken to ensure compliance with a maximum length as previously described.

Additionally, a Mutation operation is employed as previously described as it allows the GA to explore the solution space in greater detail. The mutation used in one exemplary GA 408 is a random mutation. It works by randomly selecting a node from a child chromosome then removing it and all nodes proceeding it. It now looks at the node prior to the selected node and selects a different connected node. From this newly selected node a route is found using the greedy route-finder algorithm 414 to the destination node. Once mutation is complete the new chromosomes are checked to see if they are the same as another solution in the population, if they are unique then they are added to the population.

Figure 8:
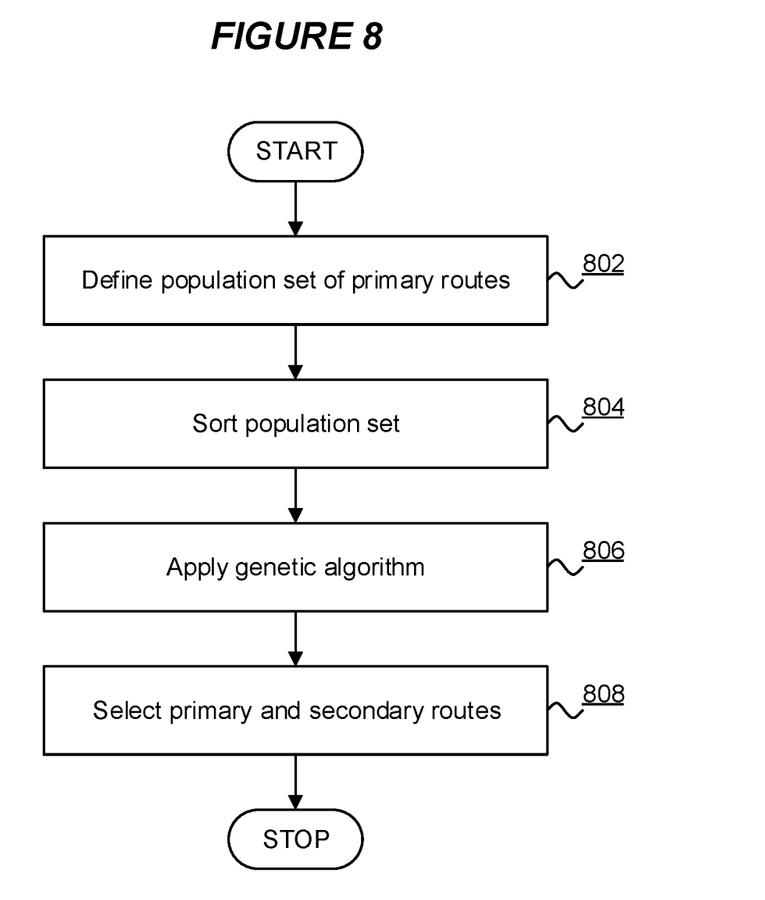
FIG. 8 is a flowchart of a method to determine non-intersecting primary and secondary routes between source and destination nodes in a communications network represented by a graph data structure according to embodiments of the present disclosure.

FIG. 8 is a flowchart of a method to determine non-intersecting primary and secondary routes between source and destination nodes in a communications network represented by a graph data structure according to embodiments of the present disclosure. Initially, at 802, a population set of primary routes between a source and destination node is defined including an initial primary route and one or more mutations of the initial primary route. At 804 the population set is sorted so that, at 806, the genetic algorithm 408 can select, crossover and mutate pairs or primary routes that correspond to relatively promising solutions. The genetic algorithm 408 operates iteratively on selected pairs of primary routes until a stopping condition is reached. Subsequently, at 808, a primary and corresponding secondary route is selected having a lowest aggregate total weight of edges.

Insofar as embodiments of the present disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of determining non-intersecting primary routes and secondary routes between a source node and a destination node in a communications network represented by a graph data structure of a plurality of nodes and a plurality of edges, each of the plurality of edges having associated a weight corresponding to a resource involved in traversing the respective edge, the computer implemented method comprising:

defining a population set of primary routes based on at least one initial primary route between the source node and the destination node and at least one additional primary route defined based on a mutation of the at least one initial primary route, wherein the at least one initial primary route is determined by a greedy route-finding algorithm, and wherein each primary route in the population set of primary routes identifies a secondary route based on the greedy route-finding algorithm applied to a graph excluding edges in the respective primary route, such that the population set of primary routes and the identified secondary routes are non-intersecting routes, each comprising at least one edge of the plurality of edges, through the graph data structure;

applying a genetic algorithm to the population set of primary routes to iteratively select and crossover one or more pairs of the primary routes in the population set of primary routes, the genetic algorithm being applied until a stopping condition is reached, wherein at least a subset of the selected one or more pairs of the primary routes are mutated in the population set of primary routes; and selecting, from the population set of primary routes, a primary route and a corresponding secondary route of the identified secondary routes that together have a lowest aggregate weight of edges.

2. The computer implemented method of claim 1, wherein mutation of a route includes randomly replacing a node of the route with an alternate node and generating a remainder of the route from the alternate node to the destination node or from the source node to the alternate node, the alternate node being selected based on accessibility of the alternate node via a preceding node or a succeeding node in the route.

3. The computer implemented method of claim 1, wherein crossover of a selected pair of primary routes includes dividing each of a first route and a second route of the selected pair of primary routes into a head portion and a tail portion and connecting the head portion of the first route to the tail portion of the second route and vice versa, so as to generate two new primary routes.

4. The computer implemented method of claim 3, further comprising, responsive to a determination that at least one of the two new primary routes is an invalid route due to any two adjacent nodes in the invalid route not being provided with an edge between the two adjacent nodes in the graph data structure, adjusting the invalid route to determine at least one revised route by applying the greedy route-finding algorithm to the two adjacent nodes and including the at least one revised route in the population set of primary routes.

5. The computer implemented method of claim 4, wherein defining the population set includes determining a longest route length of routes in the population set of primary routes; and wherein the two new primary routes having a length exceeding the longest route length are not included in the population set of primary routes.

6. The computer implemented method of claim 1, wherein the genetic algorithm periodically triggers sorting of the population set of primary routes according to a lowest aggregate weight of edges in each primary route and corresponding secondary route in the population set such that, in each iteration, the genetic algorithm is operable on one or more pairs of primary routes in the population set selected as having relatively lower aggregate edge weights than a statistical mean, an average, a mode, or a percentile of aggregate edge weights in the population set.

7. A computer system comprising a processor and a memory storing computer program code for performing the computer implemented method of claim 1.

8. A non-transitory computer-readable storage medium comprising computer program code to, when loaded into a computer system and executed thereon, cause the computer system to perform the computer implemented method of claim 1.

* * * * *